(12) United States Patent
Zheng et al.

(10) Patent No.: US 11,691,202 B2
(45) Date of Patent: Jul. 4, 2023

(54) METAL 3D PRINTING SYSTEMS FOR USING SAND AS SUPPORTS

(71) Applicant: Hitachi, Ltd., Tokyo (JP)

(72) Inventors: LiLi Zheng, Novi, MI (US); Wei Yuan, Novi, MI (US)

(73) Assignee: HITACHI, LTD., Tokyo (JP)

( * ) Notice: Subject to any disclaimer, the term of this patent is extended or adjusted under 35 U.S.C. 154(b) by 59 days.

(21) Appl. No.: 16/928,275

(22) Filed: Jul. 14, 2020

(65) Prior Publication Data

US 2022/0016710 A1     Jan. 20, 2022

(51) Int. Cl.
    *B22F 10/43*        (2021.01)
    *B22F 12/30*        (2021.01)
    (Continued)

(52) U.S. Cl.
    CPC .............. *B22F 10/43* (2021.01); *B22F 10/14* (2021.01); *B22F 10/68* (2021.01); *B22F 10/85* (2021.01);
    (Continued)

(58) Field of Classification Search
    CPC ......... B33Y 70/00; B33Y 70/10; B33Y 10/00; B33Y 30/00; B33Y 50/02; B29C 64/153; B29C 64/205; B29C 64/209; B29C 64/255; B29C 64/307; B29C 64/321; B29C 64/329; B29C 64/336; B29C 64/379;
    (Continued)

(56) References Cited

U.S. PATENT DOCUMENTS

| | | |
|---|---|---|
| 6,790,403 B1 | 9/2004 | Priedeman et al. |
| 2016/0236422 A1 | 8/2016 | Sakura |
| (Continued) | | |

FOREIGN PATENT DOCUMENTS

| | | |
|---|---|---|
| JP | 4091324 B2 | 5/2008 |
| WO | 2016/073409 A1 | 5/2016 |

OTHER PUBLICATIONS

Lefky, C. et al. "Dissolvable Supports in Powder Bed Fusion-Printed Stainless Steel" 3D Printing and Additive Manufacturing, Nov. 1, 2017, vol. 4, No. 1 (10 pages).

(Continued)

*Primary Examiner* — Philip C Tucker
*Assistant Examiner* — Jimmy R Smith, Jr.
(74) *Attorney, Agent, or Firm* — Procopio, Cory, Hargreaves & Savitch LLP (57) ABSTRACT

A 3-dimensional printing system for manufacturing a part is provided. The system includes a building platform having a deposited pattern of metal powder, a sand dispensing nozzle selectively supplying sand to the building platform, a binder dispensing nozzle selectively supplying binder material to the building platform, a robotic arm supporting one or more of the sand dispensing nozzle and the binder dispensing nozzle, the robotic arm moving the one or more of the sand dispensing nozzle and the binder dispensing nozzle, and a processor controlling the robotic arm to position the one or more of the sand dispensing nozzle and the binder dispensing nozzle relative to the deposited pattern of metal powder and control the sand dispensing nozzle and the binder dispensing nozzle to supply powdered sand and binder, respectively, based on a Computer Aided Drafting file associated with the part.

4 Claims, 10 Drawing Sheets

(51) Int. Cl.
    *B22F 12/41*     (2021.01)
    *B22F 12/53*     (2021.01)
    *B22F 10/14*     (2021.01)
    *B22F 10/85*     (2021.01)
    *B22F 12/00*     (2021.01)
    *B22F 10/68*     (2021.01)
    *B29C 64/379*     (2017.01)
    *B33Y 30/00*     (2015.01)
    *B29C 64/153*     (2017.01)
    *B29C 64/393*     (2017.01)
    *B33Y 50/02*     (2015.01)
    *B33Y 70/00*     (2020.01)

(52) U.S. Cl.
CPC ............ *B22F 12/222* (2021.01); *B22F 12/30* (2021.01); *B22F 12/41* (2021.01); *B22F 12/53* (2021.01); *B29C 64/379* (2017.08); *B22F 2203/00* (2013.01); *B29C 64/153* (2017.08); *B29C 64/393* (2017.08); *B33Y 30/00* (2014.12); *B33Y 50/02* (2014.12); *B33Y 70/00* (2014.12)

(58) Field of Classification Search
CPC ..... B29C 64/386; B29C 64/393; B29C 64/40; B29C 64/165; B22F 3/1055; B22F 2003/1056; B22F 2003/1057; B22F 2003/1058; B22F 2003/1059; B22F 10/20; B22F 10/14; B22F 10/25; B22F 10/28; B22F 10/43; B22F 10/68; B22F 10/85; B22F 12/222; B22F 12/224; B22F 12/30; B22F 12/41; B22F 12/53; B22F 12/55; B22F 2203/00; B22F 2999/00; B28B 1/001; Y02P 10/25
See application file for complete search history.

(56) References Cited

U.S. PATENT DOCUMENTS

2017/0165910 A1\*   6/2017   Dinardo ................. B33Y 10/00
2018/0126668 A1\*   5/2018   El-Siblani ............ B29C 64/255
2019/0084229 A1\*   3/2019   Gunther ............... B29C 64/165
2019/0322035 A1\*  10/2019   Tyler .................... B33Y 10/00
2020/0130270 A1\*   4/2020   Morris .................. B29C 70/54

OTHER PUBLICATIONS

Voxeljet Services—Service Brochure, Mar. 2018 (6 pages).

\* cited by examiner

Prior Art

FIG. 1

Prior Art

METAL 3D PRINTING SYSTEMS FOR USING SAND AS SUPPORTS

BACKGROUND

Field

The present disclosure is generally directed to additive manufacturing systems and processes, and more specifically, to additive manufacturing systems, building components and support structures for the component together.

Related Art

Compared to other manufacturing and processing methods, additive manufacturing processes (e.g., metal 3D printing or 3DP) build parts or components using incremental layer-by-layer manufacturing. As such, many related art 3DP technologies use powder or wire as a feedstock. This powder or wire is selectively melted/sintered by a focused heat source and consolidated in subsequent cooling to form a part. Related art processes may allow reliable manufacture of dense parts using certain 3DP processes for a variety of materials, including steel, aluminum and titanium alloys, superalloys, metal based composites and ceramic matrix composites. Further, the variety of 3DP may grow further to include high-performance materials such as intermetallic compounds and high entropy alloys. Thus, related art processes are allowing both rapid prototyping and rapid manufacturing applications. The rapid manufacturing applications require not only profound knowledge of the process itself, but also of the microstructure resulting from the process parameters and the properties of the manufactured parts.

Further, each related art 3DP method has specific applications based on its own advantages. Powder bed selective fusion methods may be suitable to produce complex and high accuracy components. Wire-fed 3DP methods (beam/arc) may have the highest deposition rates due to the feedstock of wire materials, which are commonly used to produce large scale components.

Figure 1:
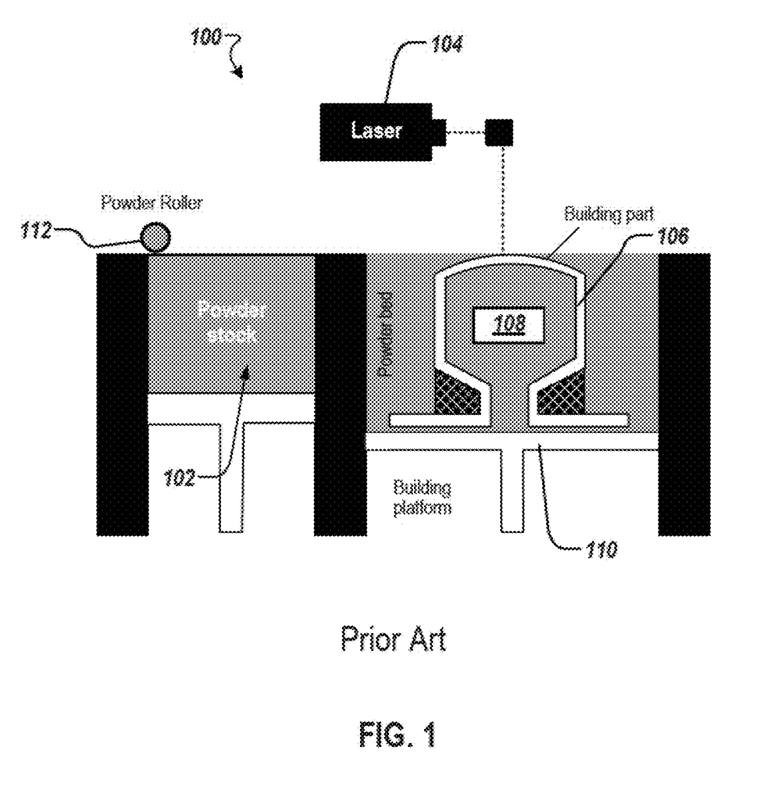
FIG. 1 illustrates an example of a related art Powder Bed Fusion (PBF) system.

In related art processes, Powder Bed Fusion (PBF) may be the most mature and widely used metal additive manufacturing process. FIG. 1 illustrates an example of a related art PBF system 100. PBF system 100 relies on selectively melting powdered material (powder stock 102) using a laser or electron beam 104. The powder may be sintered or melted by the heat source resulting in different outcomes. In sintering processes, a solid object 106 is formed when experiencing heat and mechanical compaction at a temperature below the melting point of the material. In some related art applications, a binding agent may also be introduced sometimes to hold the structure stronger during the build and the binding agent may be burned off later during the curing cycle in an oven.

In melting processes, the powder is welded together into a completely dense solid. The printing process inside of a sealed chamber 108 in the printer 100 starts with the powder spreading from the powder bed to the surface of the building platform 110. The heat source beam 104 will selectively melt or sinter the first layer of powder. Then the depth of the building plate or platform 110 is lowered by one layer and additional powder is relocated on the surface of the building plate or platform 110 with a blade, roller or wiper. The melting process is repeated layer by layer.

Figure 2A:
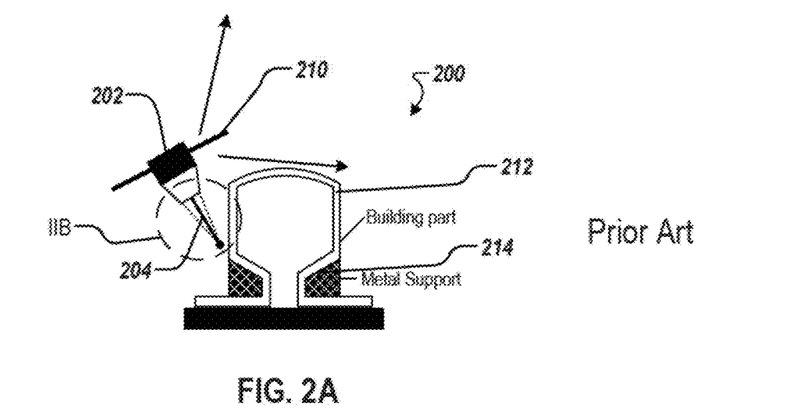
FIG. 2A illustrate an example of a related art Direct Energy Deposition (DED) system and FIG. 2B illustrates an enlarged portion of the region IIB of FIG. 2A.
Figure 2B:
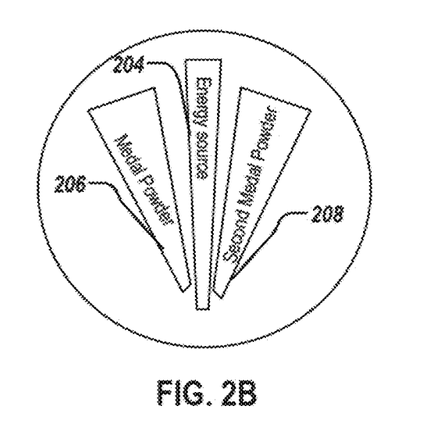

Further, in the related art, a Direct energy deposition (DED) is a more complex 3DP process. FIG. 2A illustrate an example of a related art DED system 200 and FIG. 2B illustrates an enlarged portion of the region II-B of FIG. 2A. Similar to PBF, DED uses a focused energy source 204, such as laser or electron beam to melt the material. Unlike PBF, material is melted at the same time as it is deposited by the nozzle 202 in DED processes. The technique works by depositing material 206 onto a base or component through a nozzle mounted on a multi axis arm 210. The different metal materials are fed to different nozzles 206, 208 in powder or wire form. As it is being deposited, a heat source melts the material simultaneously. The procedure is done repeatedly, until the layers have solidified to form the part 212. The DED process is typically used with metals, in form of either powder or a wire. This process may be used to repair metal parts that have been damaged.

A number of possible benefits can be achieved using related art PBF or DED processes compared to traditional manufacturing process including, for example, geometric complexity at no extra cost, optimized lightweight structures, increased part functionality, merging assemblies into a single part, excellent material properties, and uniform microstructures.

However, the related art processes suffer from the poor surface finish and difficulties removing the support structures 214. Support structures 214 may play an important role in 3DP, even if they are not part of the model. The support structure may be used to support overhang or bridge sections of the model during printing. Further, in the complex geometries that 3DP is best suited for, these support structures are likely to be encountered often.

Further, support structures also play an important role defusing heat and enhancing rigidity if there are high thermal gradients involved in printing. Though support structures may be beneficial, they can also present disadvantages. For example, support structures may cause the waste of material as they must be manufactured and then removed from the finished product. Moreover, significant effort may be required to remove them. For example, even though sometimes lattice support structures are created, removing them and keeping the fine surface finish may be extremely challenging in the related art. Example implementations of the present application may address these problems.

SUMMARY

In order to address the disadvantages of the related art, the present application proposes to introduce a second material (e.g., sand ($SiO_2$)) together with a binder material to print a support structure using PBF and DED printing systems. In the related art PBF printing systems, only single material is allowed in order to avoid contamination and reactions from different materials. However, in example implementations, sand may be used as support in metal 3DP because sand is stable and safe with metals even at high temperature. For example, robotic injectors will be introduced with the capability to exactly distribute powders to the desired locations. As described below, PBF and DED will be discussed as examples for adopting aspects of this disclosure. However, other methods may also be adopted with modifications that might be apparent to a person of ordinary skill in the art.

Aspects of the present application include a 3-dimensional (3D) printing system for manufacturing a part. The system may include a building platform having a selectively deposited pattern of metal powder, a sand dispensing nozzle configured to selectively supply powdered sand to the building platform, a binder dispensing nozzle configured to selectively supply binder material to the building platform, a robotic arm configured to support the one or more of the sand dispensing nozzle and the binder dispensing nozzle, the robotic arm moving the one or more of the sand dispensing nozzle and the binder dispensing nozzle, and a processor controlling the robotic arm to position the one or more of the sand dispensing nozzle and the binder dispensing nozzle relative to the selectively deposited pattern metal powder and control the sand dispensing nozzle and the binder dispensing nozzle to supply powdered sand and binder, respectively, based on a Computer Aided Drafting file associated with the part.

Further aspects of the present application include a sand injection system for a 3-dimensional (3D) printer having a building platform having a selectively deposited pattern of metal powder. The sand injection system may include a sand dispensing nozzle configured to selectively supply powdered sand to the building platform, a binder dispensing nozzle configured to selectively supply binder material to the building platform, a robotic arm configured to support the one or more of the sand dispensing nozzle and the binder dispensing nozzle, the robotic arm moving the one or more of the sand dispensing nozzle and the binder dispensing nozzle, and a processor controlling the robotic arm to position the one or more of the sand dispensing nozzle and the binder dispensing nozzle relative to the selectively deposited pattern metal powder and control the sand dispensing nozzle and the binder dispensing nozzle to supply powdered sand and binder, respectively, based on a Computer Aided Drafting file associated with 3D printed part.

Additional aspects of the present application may also include a metal powder dispensing nozzle configured to selectively supply metal powder, wherein the processor controls the metal powder dispensing nozzle to form the selectively deposited pattern of the metal powder.

Further aspects of the present application may also include the sand dispensing nozzle, the binder dispensing nozzle, and the metal powder dispensing nozzle being all located on the robotic arm, wherein the processor controls the robotic arm to position the selectively deposited sand, powder and metal powder based on the Computer Aided Drafting file associated with the part.

Additional aspects of the present application may include a focused energy source, wherein the processor controls the focused energy source to apply heat to the selectively deposited pattern of metal powder.

Further aspects of the present application may include the focused energy source being located on the robotic arm.

Additional aspects of the present application may include metal powder stock located adjacent to the building platform; wherein the focused energy source is located on the robotic arm, a roller positioned to spread metal powder from the stock across the building platform to form the selectively deposited pattern of metal powder, and a focused energy source, wherein the processor controls the focused energy source to apply heat to the selectively deposited pattern of metal powder.

Further aspects of the present application may include a powder scraper positioned above the building platform and configured to remove excess powder material from the selectively deposited pattern of metal powder prior to deposition of additional metal powder.

Additional aspects of the present application may include the building platform being selectively lowered, and the processor selectively controlling the building platform to lower the building platform as the part is printed.

DETAILED DESCRIPTION

The following detailed description provides details of the figures and embodiments of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Embodiments as described herein can be utilized either singularly or in combination and the functionality of the embodiments can be implemented through any means according to the desired implementations.

As described above, support structures can be important for metal 3DP processes including Powder Bed Fusion (PBF) and metal Direct Energy Deposition (DED) processes. As the complexity of the printed parts increases, the likelihood of encountering a multitude of these features in a component increases as well. Additionally, the support structure may be necessary to resist deformation or even collapse caused by gravity as the fabrication of the component proceeds and can also limit the effects caused by generated thermal gradients during the process and shrinkage upon solidification to help to reduce thermal distortion that can potentially lead to cracking, curling, sagging, delamination and shrinkage.

Therefore, support structures enable the 3DP of complex components. However, these support structures need to be removed after printing and can result in a potential increase in material consumption, energy usage and the amount of work for manual post-processing required to produce the final part.

The need to remove the support structures in metal 3DP is one factor that may have prevented 3DP being adopted for mass production so far. Often metal 3DP is used only for rapid prototyping, which has lower standards or less quality requirements for the finish. However, in real production, quality of surface finish plays an important role as the function of the part.

Figure 3:
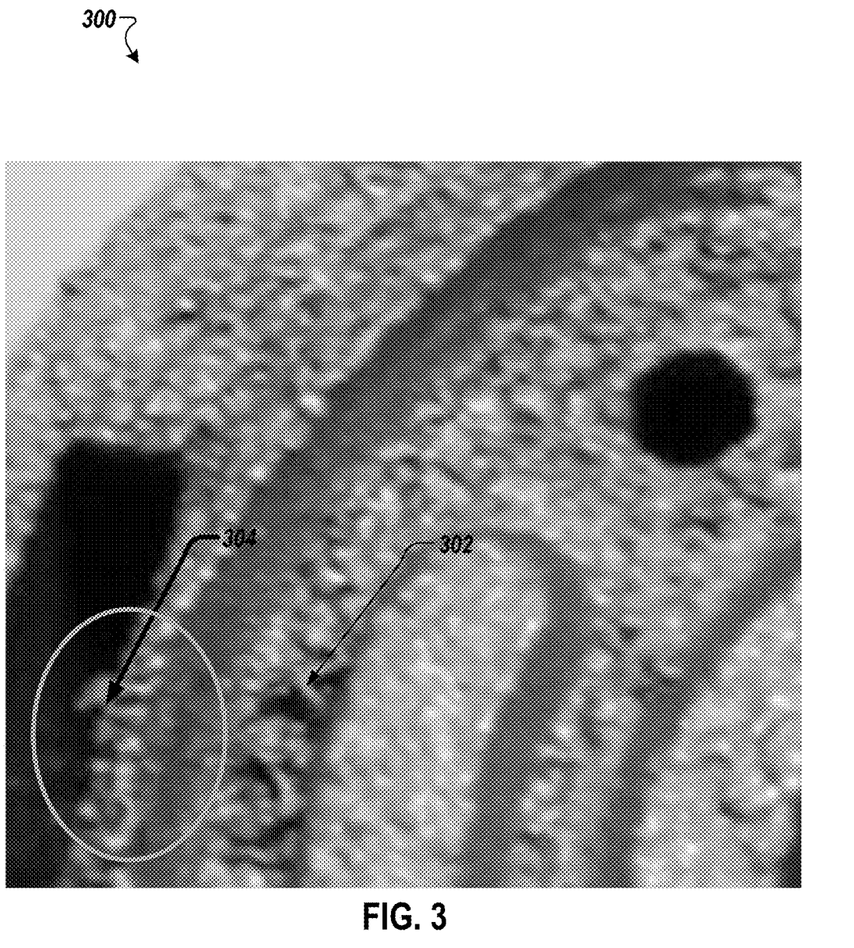
FIG. 3 illustrates a photo of an example of a product printed using a PBF process with stainless steel.

FIG. 3 illustrates a photo of an example of a product 300 printed using a PBF process with stainless steel. As illustrated, the top surface 302 shows the finish after support structure is removed. It is easy to observe the coarse surface finish of the top surface as highlighted by the provided circle. Additionally, at least one remaining support structure 304 can be seen. This product 300 may be one among several others printed at once. This product 300 may be marked as a failure and may not be sent out for functional testing. Example implementations of the present application may solve this issue and realize mass production for metal 3DP by modifying the creation of the support structures.

Considering the drawbacks that support structure may bring to metal 3DP, especially in PBF and DED, example implementations may provide novel methods of building the support structures in metal 3DP. Example implementations of the present disclosure may use sand powder ($SiO_2$) as the support structure material instead of any types of metal powders. Sand has been applied in metal casting for a long history and has performed well in other types of metal casting processes. Sand has stable chemical properties and a completely different nature from metal powder. Thus, sand provides a more improved support structure material than metal powders in 3DP processes.

In some example implementations, a 3DP manufacturing system may be modified to change the supporting materials from metal powder to sand. In a first type of modification, referred to herein as "Building Sand Support in Printing", the 3DP system may be modified to position sand alongside the positioned metal powder. In a second type of modification, referred to herein as "Pre-Printed Sand Support", sand support features may be printed in advance of the positioning of the metal particles. Each of these types of modifications is discussed in greater detail below.

Figure 4A:
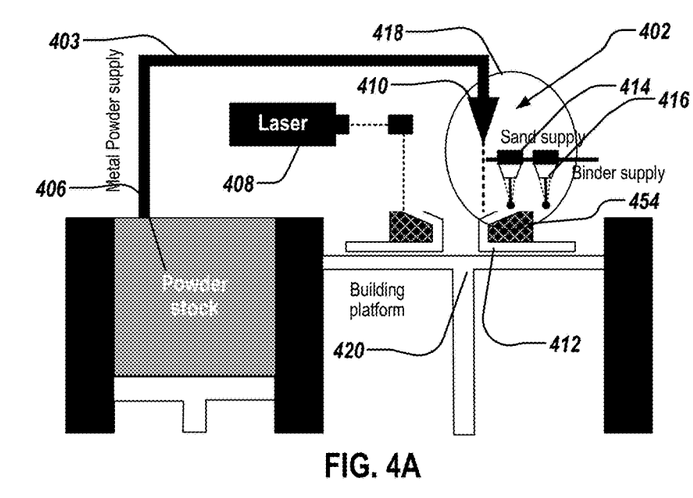
FIGS. 4A and 4B illustrate 3-dimensional printing systems that build sand support structures during printing in accordance with example implementations of the present application.
Figure 4B:
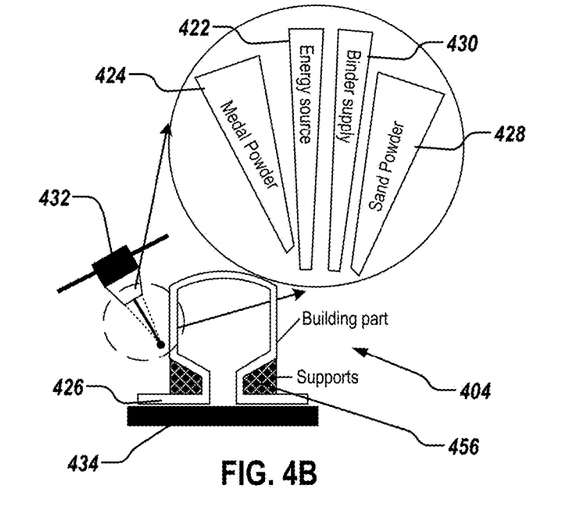

FIGS. 4A and 4B illustrate 3DP systems using the "Building Sand Support in Printing" modifications in accordance with example implementations of the present application. FIG. 4A illustrates a PBF system 402 and FIG. 4B illustrates a DED system 404.

As illustrated in FIG. 4A, the PBF system 402 relies on selectively melting powdered metal material (powder stock 406) using a laser or electron beam 408. The powdered material 406 may supplied through a supply tube 403 to be injected or applied by a metal powder dispensing nozzle 410 and may be sintered or melted by the heat source (e.g., laser or electron beam 408) to form a solid object 412. Additionally, the PBF system 402 system includes a sand dispensing nozzle 414 to selectively supply sand powder separately from the powdered metal material in different and desired locations to print a sand support structure 454. Further, the PBF system 402 also includes a binder dispensing nozzle 416 to inject binders for joining sand powder to form a sand support structure. Each of the nozzles 410, 414 and 416 may be mounted on a single robotic arm 418 and selectively controlled to inject the metal powder, sand and binder to the surface of the building platform 420 as needed to assemble the desired part. In some example implementations, the building platform 420 may be selectively lower through a lift mechanism such as a hydraulic lift, a screw lift, a stepper motor, or any other lowering mechanism that might be apparent to a person of ordinary skill in the art.

As the metal powder, sand and binder are placed layer by layer, the laser or electron beam 408 melts or welds the metal powder to form a completely dense solid. Specifically, during the printing process in PBF system 402, the metal powder, sand, and binder are spread on the building platform 420. The beam of the heat source (laser or electron beam 408) will selectively melt or sinter the first layer of metal powder but not affect the sand and binder. Then the depth of the building platform 420 is lowered by one layer and additional metal powder, sand and binder applied to the next layer by the nozzles 410, 414 and 416. The melting process is repeated layer by layer. After printing, sand powder and metal powder may need to be separated to reduce material waste. For example, magnetic metal powder may be used to facilitate separation of the metal powder from the sand.

As illustrated in FIG. 4B, a DED system 404 similarly relies on selectively melting powdered metal material using a focused energy source 422 (e.g., laser or electron beam). Powdered metal material may be injected or applied by a metal powder dispensing nozzle 424 and may be sintered or melted by the focused energy source 422 (e.g., laser or electron beam) to form a solid object 426. Additionally, the DED system 404 includes a sand dispensing nozzle 428 to selectively supply sand powder separately from the powdered metal material in different and desired locations. Further, the DED system 404 also includes a binder dispensing nozzle 430 to inject binders for joining sand powder to form a sand support structure 456. As illustrated in FIG. 4B, the focused energy source 422 and the nozzles 424, 428 and 430 may be collectively mounted on a single robotic arm 432. Using the robotic arm, the nozzles 424, 428 and 430 may be selectively controlled to inject the metal powder, sand or binder to the surface of the building platform 434 or the assembled object 426 and the focused energy source 422 used to melt the metal powder. Again, the melting process is repeated layer by layer. After printing, sand powder and metal powder may need to be separated to reduce material waste. For example, magnetic metal powder may be used to facilitate separation of the metal powder from the sand.

Figure 4C:
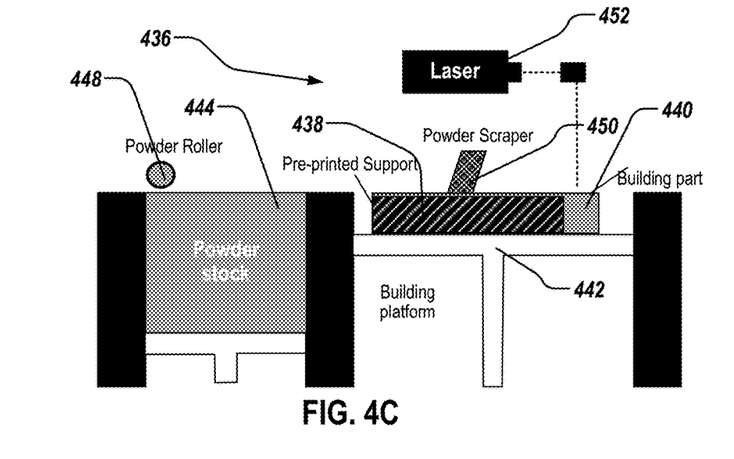
FIGS. 4C and 4D illustrate 3-dimensional printing systems use a Pre-Printed Sand Support in accordance with example implementations of the present application.
Figure 4D:
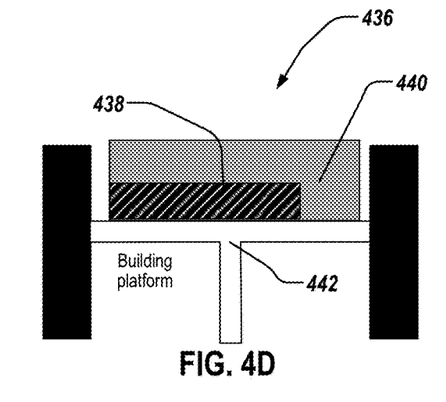

FIGS. 4C and 4D illustrate a 3DP system 436 using "Pre-Printed Sand Support" modifications in accordance with example implementations of the present application. In such example implementations, a sand printing system may be used to pre-print the support structure 438 according to the design of the part 440 being built. The support structure 438 may be a single unitary body or may be several different pieces as required by the metal printing process and part design. FIG. 4C illustrates an overall design for the PBF system 436 using the pre-printed sand support structure 438. As illustrated, the pre-printed support 438 is placed on the building platform 442 and powdered metal material (powder stock 444) is provided around the pre-printed support 438 by a powder roller 448. Further, a powder scrapper 450 may also be provided over the building platform 442 to brush additional metal powder sitting on top of the sand support structure 438. The high energy system 452 (e.g., laser or electron beam) may melt or sinter the metal powder material supported by the pre-printed support 438 to form the part 440 layer by layer. As each metal powder layer is formed, the building platform 442 may be lowered.

FIG. 4D illustrates the final product 440 printing by the 3DP system 436 showing the sand support structure 438 and the metal part 440 respectively. Though not illustrated, DED system may be similarly modified to use pre-printed sand supports.

Figure 5:
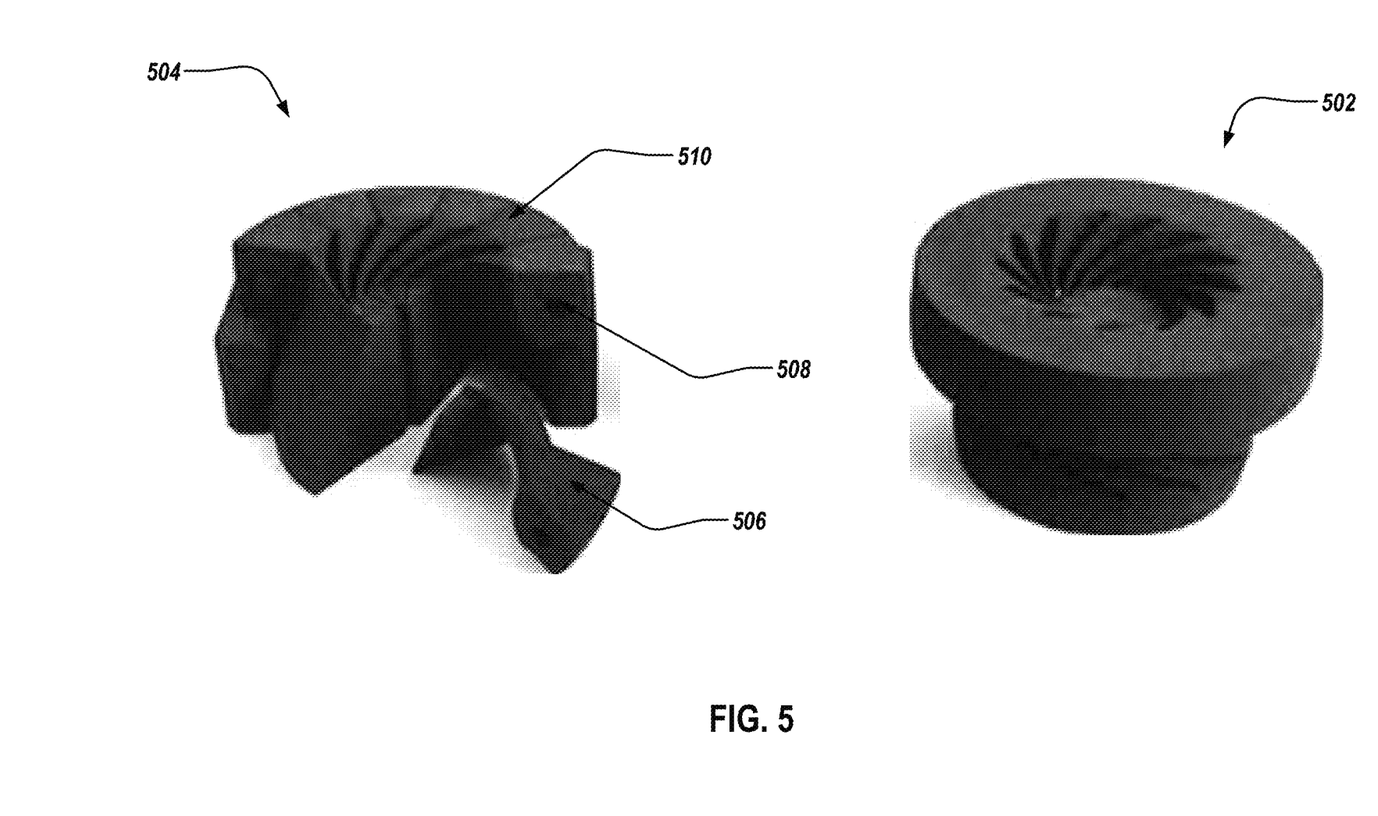
FIG. 5 illustrates photos comparing a 3D printed sand support core in accordance with an example implementation of the present application and a sand support core 504 manufactured using related art methods (e.g., non-3D printed techniques).

FIG. 5 illustrates photos comparing a 3D printed sand support core 502 in accordance with an example implementation of the present application and a sand support core 504 manufactured using related art methods (e.g., non-3D printed techniques). As illustrated, the 3D printed sand support core 502 may be unitary construction having intricate shapes and features. Conversely, related art sand support core 504 is formed by a plurality of interlocking pieces 506, 508, 510

As discussed briefly above, sand has historically been used in the casting industry because of numerous advantages including being inexpensive, easily recycled, and heat resistant and capable of withstanding extremely high temperature. Initially, green sand (an aggregate of sand, pulverized coal, bentonite clay, and water) was traditionally used in sand casting, but modern chemically bonded molding systems have become more widely used. A frequently used casting sand is Silicon Oxide or Silica ($SiO_2$).

Recently, 3D printing foundry sand (e.g., silica sand) has become available in some 3DP systems. During the 3D sand printing process, silica sand is applied in layers and selectively bonded with a binder until the desired shape is formed. According to different applications, a variety of binders can be selected, such as furan, phenolic resins, inorganic binders, or any other binder that might be apparent to a person of ordinary skill in the art as nearly all types of binders used in casting foundries may be used as binders in 3DP in accordance with example implementations of the present application.

A process of 3D printing a sand core (e.g., sand core 502) is similar to metal printing, including 1) transferring a Computer Aided Drafting (CAD) file or CAD data to sand printing machine, 2) spreading a layer of sand powder in a building plate or platform, 3) selectively spreading binder on sand, 4) lowering the building platform, 5) repeating the previous process until the final shape is achieved, and 6) removing the unbound powder and finish part building. This process may be used to pre-print the sand core prior to printing the metal product or printing the sand core in parallel with printing the metal product.

Figure 6:
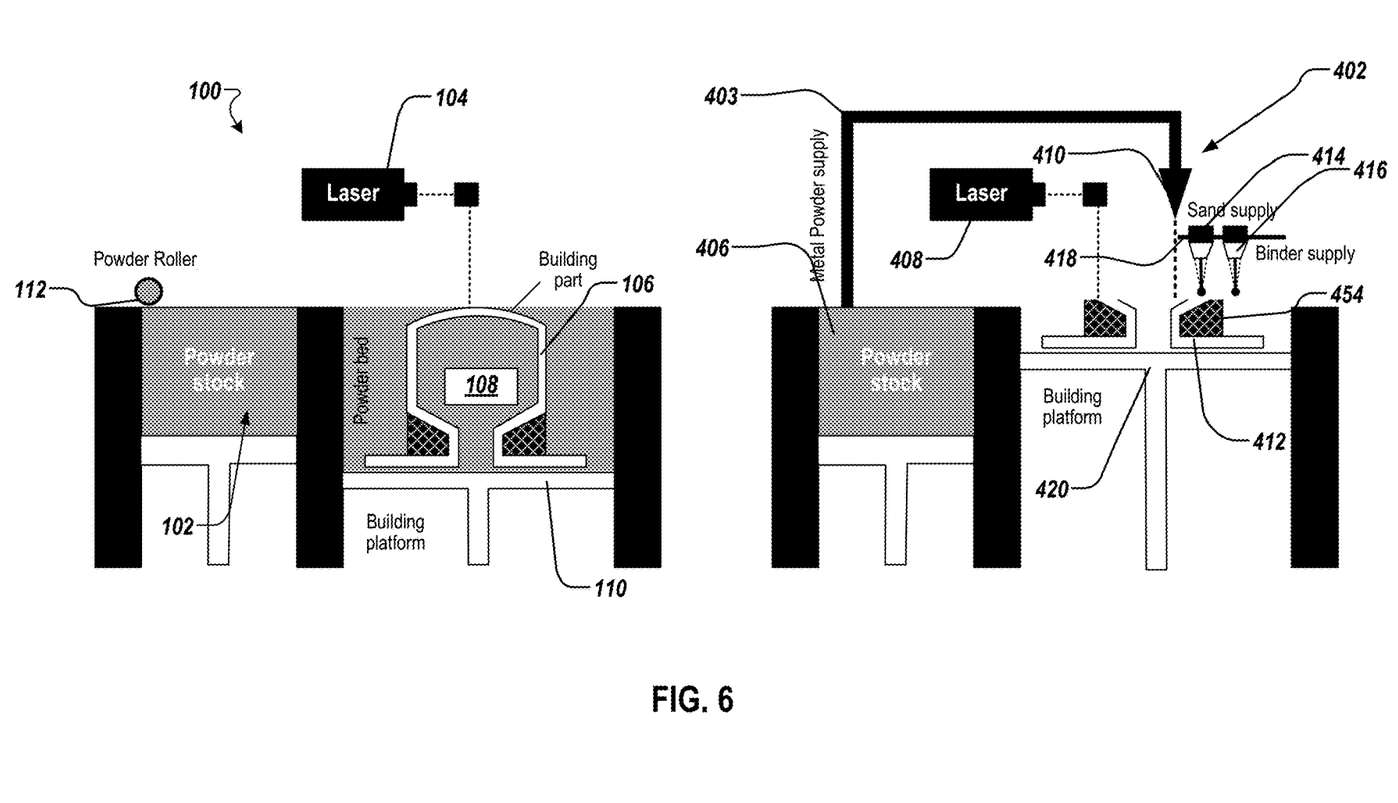
FIG. 6 illustrates a side-by-side comparison of the related art PBF system of FIG. 1 and the PBF system according to example implementations of the present application illustrated in FIG. 4A.

FIG. 6 illustrates a side-by-side comparison between the related art PBF system 100 of FIG. 1 and the PBF system 402 illustrated in FIG. 4A. In order to supply sand into desired areas on the building platform 420, the PBF system 402 is provided with at least three nozzles 410, 414 and 416, providing metal powder, sand and binding agents, respectively. The nozzles 410, 414 and 416 may be mounted on robotic arms or conveyors 418 to be selectively positioned to accommodate the simultaneous printing of the metal part 412 and the sand support structure 454. Robotic arms 418 may be built within the system to position the nozzle 410 to selectively distribute a layer of metal powder in desired location, and position the nozzles 414 and 416 to selectively distribute a layer of sand powder and binder in desired location.

Additionally, the printing process may also be modified to facilitate building a layer of the sand support structure 454 between printing layers of the metal part 412. In other words, a layer of the part 412 may be printed from metal powder dispensed from the nozzle 410. Before any metal powder is dispensed for a new, subsequent layer, the system 402 will automatically determine whether there is a need to build support in this layer based on the CAD file. If no support structure is required, the next layer of part 412 will be printed using the metal powder from the nozzle 410 followed by selectively binding/melting the powder by focused energy source (e.g., laser or electron beam 408). Conversely, if a support structure 454 is required, robotic arms 418 will be utilized to position nozzle 410 to supply metal powder at specific locations. The robotic arms 418 may also be used to position nozzles 414 and 416 to supply a new layer of sand powder selectively on desired locations and to supply binders selectively on the layer of sand powder. The focused energy source (e.g., laser or electron beam 408) may then be used as normal to melt or sinter the metal powder. The whole process will be repeated until the final parts are built. In some example implementations, metal layers having no supporting structures may form a roller feeding metal powder from the powder stock onto the building platform similar to powder roller 112 of the related art system 100.

Figure 7:
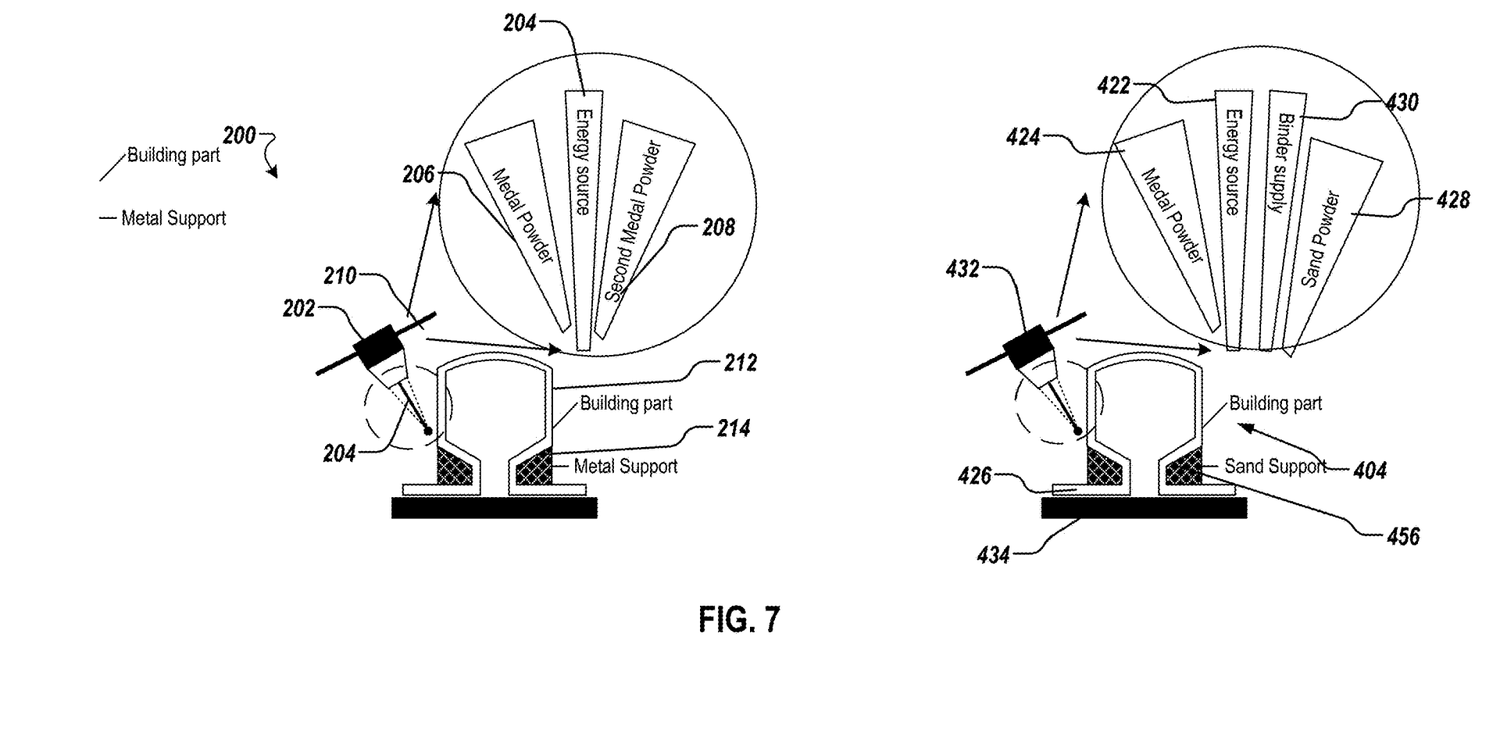
FIG. 7 illustrates a side-by-side comparison between the related art DED system of FIG. 2 and the DED system according to example implementations of the present application illustrated in FIG. 4B.

FIG. 7 illustrates a side-by-side comparison between the related art DED system 200 of FIG. 2 and the DED system 404 illustrated in FIG. 4B. In addition to PBF process, metal DED process is also a potential application of the current disclosure. In the related art DED system 200, at least two different types of metal powder/wire can be applied in the process (e.g., metal powder from nozzle 206 and second metal powder from nozzle 208). However, in the DED system 404 in accordance with example implementations of the present application, the second metal powder dispensing nozzle 208 is replaced with a sand powder supply nozzle 428 and a binder supply nozzle 430 to build a sand support structure 456 simultaneously with the printing of the part 426. Thus, a metal powder(?) supply nozzle 424, sand powder supply nozzle 428, binder supply nozzle 430, and focused energy source 422 may be collectively mounted on a single robotic arm 432 moved over the building plate 434 to selectively place metal powder, sand, binder and heat to form the part 426 and the sand support structure 456 simultaneously. Inclusion of printing a sand supporting structure 456 into a DED system is feasible due to the DED system already involving selectively metaling and fusing material as deposited by a robotic arm.

Figure 8A:
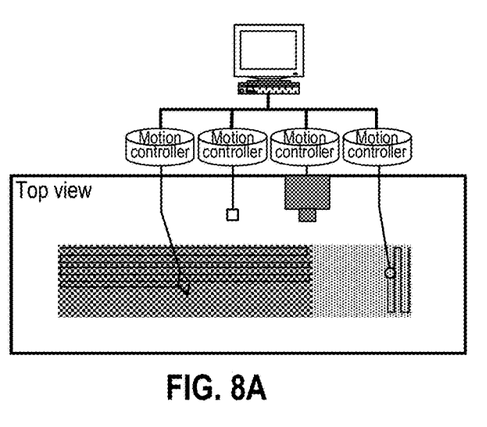
FIGS. 8A-8D illustrate a 3D printing process of a PBF system in accordance with an example implementation of the present application.
Figure 8B:
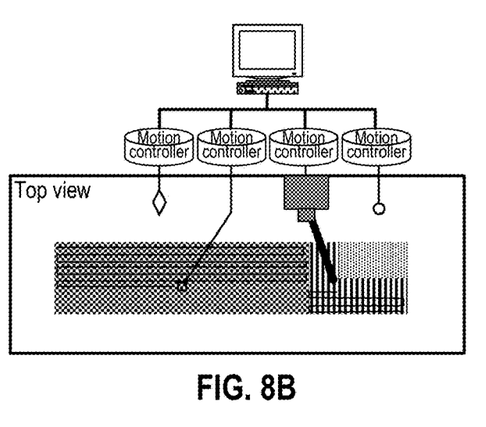
Figure 8C:
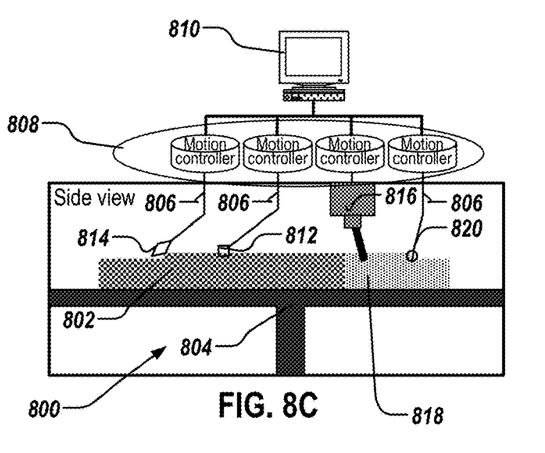

FIGS. 8A-8D illustrate a PBF 3DP process of a PBF system 800 using a simultaneously printed sand support structure 802 in accordance with an example implementation of the present application. FIGS. 8A and 8B illustrate top views of the system 800 and FIGS. 8C and 8C illustrate side views of the system 800.

The PBF system 800 includes a sand supply nozzle 814, a binder supply nozzle 812 and a metal powder supply nozzle 820, each nozzle mounted on a computer controlled robotic arm 806. As illustrated, a separate robotic arm 806 may be provided for each of the sand supply nozzle 814, the binder supply nozzle 812 and the metal powder supply nozzle 820. However, example implementations of the present application may include a single robotic arm supporting more than one of the sand supply nozzle 814, the binder supply nozzle 812 and the metal powder supply nozzle 820.

The robotic arm 806 may be controlled by one or more motion controllers 808 communicatively coupled to a computing device 810 controlling the 3DP process. The computing device 810 may be a computing device 1005 of the computing environment 1000 discussed below with respect to FIG. 10.

As illustrated in FIGS. 8A and 8C, the sand support structure 802 and the part 818 are manufactured layer by layer on the building platform 804. Specifically, the sand supply nozzle 814 and the metal powder dispensing nozzle 820 may be moved and positioned over the building platform 804 by the robotic arms 806 as controlled by the motion controllers 808 based on information in a CAD file. Thereby, sand and metal powder may be distributed around the building platform 804 to form a layer of the sand support structure 802 and the metal part 818. In some example implementations, the building platform 804 may be selectively lower through a lift mechanism such as a hydraulic lift, a screw lift, a stepper motor, or any other lowering mechanism that might be apparent to a person of ordinary skill in the art.

Further, as illustrated in FIGS. 8B and 8C, the binder dispensing nozzle 812 may also be moved over the layer of sand deposited by the sand supply nozzle 814 to selectively supply binder to structure the sand layer of the support structure 802. Additionally, the focused energy source (e.g., laser or electron-beam 816) may also move over the layer of metal powder deposited by the metal powder supply nozzle 820 to melt or sinter the metal to form a layer of the part 818. The focused energy source (e.g., laser or electron beam 816) is controlled by one or more motion controllers 808 communicatively coupled to the computing device 810 to melt the metal powder to form the part 818. Layer by layer the part 818 may be built up and the building platform 804 is lowered, until the part 518 extends over the top of the support structure 902 as illustrated in FIG. 8D.

Figure 8D:
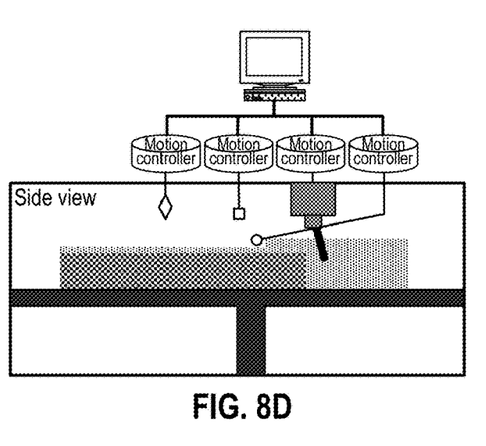

As illustrated in FIG. 8D, as the part 818 is formed over the top of the support structure 802, the metal powder may be deposited onto the support structure and then melted by the focused energy source 816.

Figure 9A:
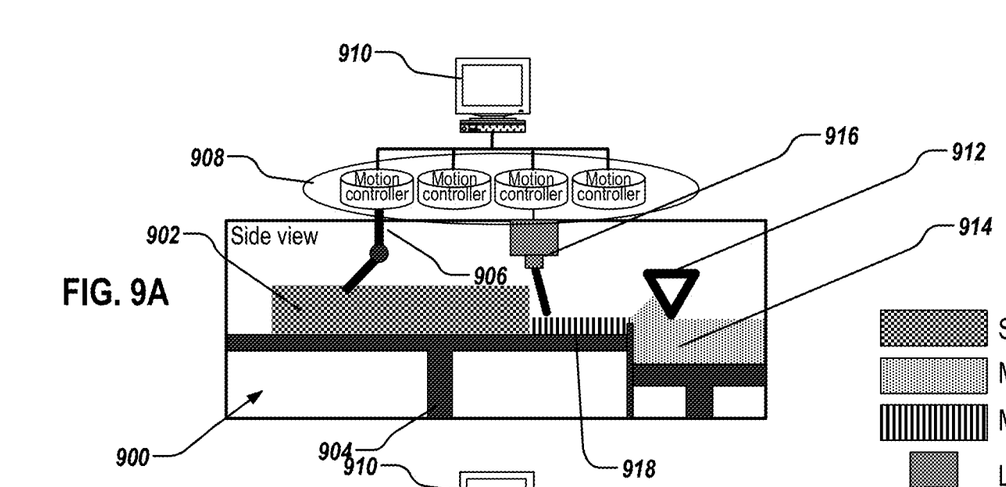
FIGS. 9A-9B illustrate 3DP process of a PBF system in accordance with an example implementation of the present application.
Figure 9B:
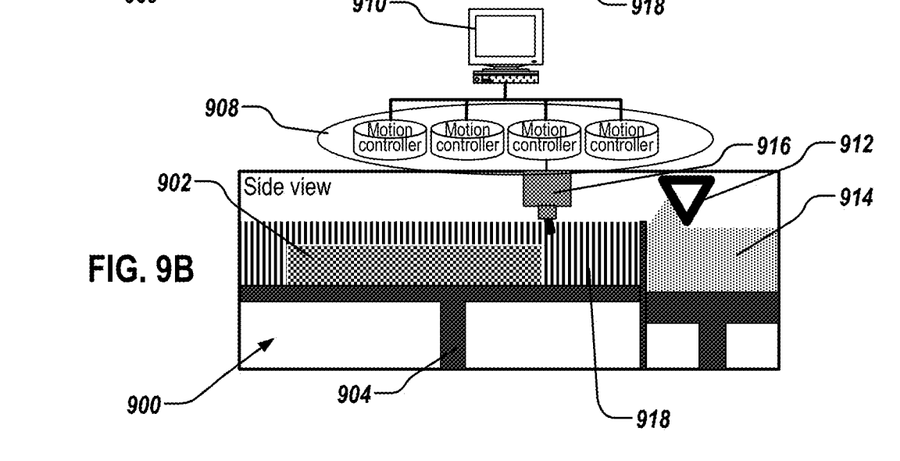

FIG. 9A-9B illustrate side views a PBF 3DP process of a PBF system 900 using a pre-printed sand support structure 902 in accordance with an example implementation of the present application. In some example implementations, the process illustrated by FIGS. 9A and 9B may be used in situations where the metal powder doesn't have any magnetic property and a manufacturer wants to reduce material waste.

Instead of printing a sand support structure 902 simultaneously with the printing of the metal parts, the support structure 902 may be printed in advance using sand and binding agent in any suitable printing systems. The sand support 902 may be a single unitary piece or may be formed from several pieces printed separately as desired. As illustrated in FIG. 9A, the pre-printed support structure 902 may be placed on the building platform 904 of the PBF system 900. In some example implementations, pre-programed robotic arms 906 may bring necessary pre-printed supports 902 to desired locations when required. The robotic arms 906 are not required to bring the pre-printed supports 902 simultaneously and instead there can be several pieces of supports pre-printed and may be in discontinuous locations of the building platform 904.

In some example implementations, the robotic arms 906 may be controlled by one or more motion controllers 908 communicatively coupled to a computing device 910 controlling the 3DP process. The computing device 910 may be a computing device 1005 of the computing environment 1000 discussed below with respect to FIG. 10.

As illustrated in FIG. 9A, when printing starts the preprinted support structure 902 is positioned to one side of the building platform 904 and the powder roller 912 pushes metal powder from the powder stock 914 onto the building platform 904. The focused energy source (e.g., laser or electron beam 916) is controlled by one or more motion controllers 908 communicatively coupled to the computing device 910 to melt the metal powder to form the part 918. Layer by layer the part 918 may be built up and the building platform 904 is lowered, until the part 918 extends over the top of the support structure 902 as illustrated in FIG. 9B.

In some example implementations, over accumulated powder has to be removed by a brush, scraper or other similar tool before any printing on top of the support structure 902. This is due to when building the part 918 beside the support structure 902, the powder roller 912 may add metal powder on top of support structure 902. Though a PBF process is illustrated in FIGS. 9A and 9B, a DED printing system may also be provided in example implementations of the present application.

The example implementations described herein feature sand support structures. In the related art, support structures normally need to be removed during post-processing. In the related art, most of soluble supports are removed by hand or using flush cutters. Sometimes there may be lattice structures that can be difficult to remove and may cause damage to the printing part if located in critical locations. Further, surfaces after supports are removed sometimes have a lower printing quality and rough surface finish. In example implementations, using sand as material for building the support structure, post processing can become easy and surface finish can also be significantly improved.

Figure 10:
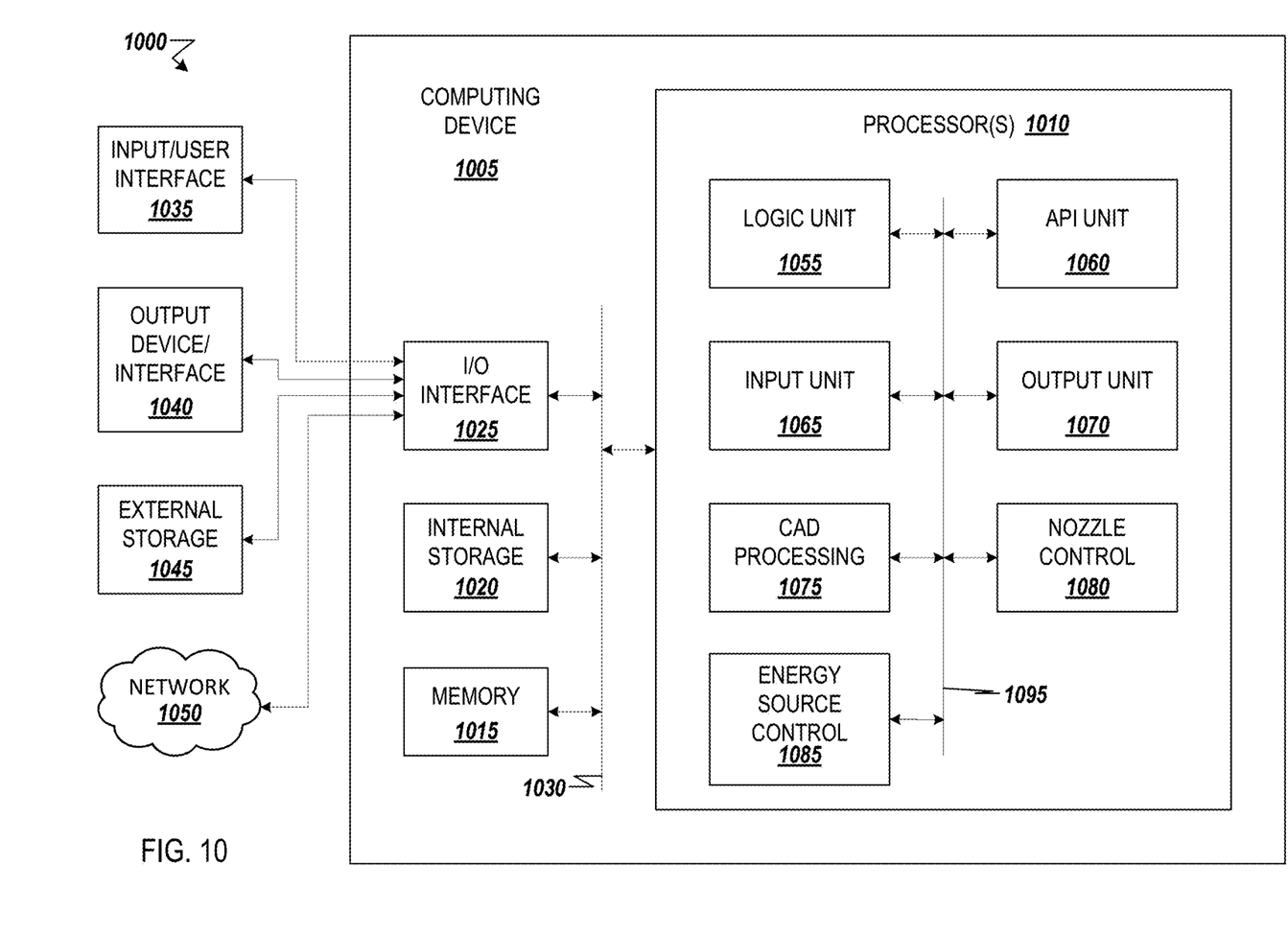
FIG. 10 illustrates an example computing environment with an example computer device suitable for use in some example implementations.

FIG. 10 illustrates an example computing environment 1000 with an example computing device 1005 suitable for use in some example implementations. Computing device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computing device 1005.

Computing device 1005 can be communicatively coupled to input/interface 1035 and output device/interface 1040. Either one or both of input/interface 1035 and output device/interface 1040 can be a wired or wireless interface and can be detachable. Input/interface 1035 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 1040 may include a display, television, monitor, printer, speaker, braille, or the like. In some example implementations, input/interface 1035 (e.g., user interface) and output device/interface 1040 can be embedded with, or physically coupled to, the computing device 1005. In other example implementations, other computing devices may function as, or provide the functions of, an input/interface 1035 and output device/interface 1040 for a computing device 1005. These elements may include, but are not limited to, well-known AR hardware inputs so as to permit a user to interact with an AR environment.

Examples of computing device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 1005 can be communicatively coupled (e.g., via I/O interface 1025) to external storage 1045 and network 1050 for communicating with any number of networked components, devices, and systems, including one or more computing devices of the same or different configuration. Computing device 1005 or any connected computing device can be functioning as, providing services of, or referred to as a server, client, thin server, general machine, special-purpose machine, or another label.

I/O interface 1025 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and networks in computing environment 1000. Network 1050 can be any network or combination of networks (e.g., the Internet, local area network, wide area network, a telephonic network, a cellular network, satellite network, and the like).

Computing device 1005 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1010 can execute under any operating system (OS) (not shown), in a native or virtual environment. One or more applications can be deployed that include logic unit 1055, application programming interface (API) unit 1060, input unit 1065, output unit 1070, CAD Processing unit 1075, Nozzle Control Unit 1080, Focused Energy Source Control unit 1085 and inter-unit communication mechanism 1095 for the different units to communicate with each other, with the OS, and with other applications (not shown).

For example, CAD Processing unit 1075, Nozzle Control Unit 1080, and Focused Energy Source Control unit 1085 may control 3DP systems in accordance with example implementations of the present application and perform processes and operations in accordance with example implementations of the present application. The described units and elements can be varied in design, function, configuration, or implementation and are not limited to the descriptions provided.

In some example implementations, when information or an execution instruction is received by API unit 1060, it may be communicated to one or more other units (e.g., CAD Processing unit 1075, Nozzle Control Unit 1080, and Focused Energy Source Control unit 1085). For example, the CAD processing unit 1075 may process a CAD file associated with a part to be printed by the 3DP system and partition the CAD file into individual slice layers. Further, the CAD processing unit 1075 may also determine locations where metal powder, sand, and binder should be deposited to form the individual slice layers of the part. The nozzle control unit 1080 may control the motion controllers to position the nozzles (e.g., a metal supply nozzle, a sand supply nozzle, and a binder supply nozzle) based on the processing done by the CAD file processing unit. Further, the focused energy source control unit 1085 may control a high powered focused energy source (e.g., a laser or an electron beam) to melt the powdered metal deposited by the metal supply nozzle to form the part layer by layer.

In some instances, the logic unit 1055 may be configured to control the information flow among the units and direct the services provided by API unit 1060, CAD Processing unit 1075, Nozzle Control Unit 1080, and Focused Energy Source Control unit 1085 in some example implementations described above. For example, the flow of one or more processes or implementations may be controlled by logic unit 1055 alone or in conjunction with API unit 1060.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced with those specifically defined or described matters or with other or different elements or matters not described. It will be appreciated by those familiar with this field that changes may be made in these example implementations without departing from the subject matter described herein, as defined in the appended claims and their equivalents.

The invention claimed is:

1. A 3-dimensional (3D) printing system for manufacturing a part, the system comprising:
   a building platform having a selectively deposited pattern of metal powder;
   a sand dispensing nozzle configured to selectively supply powdered sand to the building platform;
   a binder dispensing nozzle configured to selectively supply binder material to the building platform;
   a robotic arm configured to support one or more of the sand dispensing nozzle and the binder dispensing nozzle, the robotic arm moving the one or more of the sand dispensing nozzle and the binder dispensing nozzle;
   a processor controlling the robotic arm to position the one or more of the sand dispensing nozzle and the binder dispensing nozzle relative to the selectively deposited pattern of metal powder and control the sand dispensing nozzle and the binder dispensing nozzle to supply powdered sand and binder, respectively, based on a Computer Aided Drafting file associated with the part;
   a metal powder stock located adjacent to the building platform;
   a roller positioned to spread metal powder from the stock across the building platform to form the selectively deposited pattern of metal powder; and
   a focused energy source located on the robotic arm, wherein the processor controls the focused energy source to apply heat to the selectively deposited pattern of metal powder.

2. The 3D printing system of claim 1, wherein the sand dispensing nozzle and the binder dispensing nozzle are all located on the robotic arm, wherein the processor controls the robotic arm to position selectively deposited sand and binder based on the Computer Aided Drafting file associated with the part.

3. The 3D printing system of claim 1, further comprising a powder scraper positioned above the building platform and configured to remove excess powder material from the selectively deposited pattern of metal powder prior to deposition of additional metal powder.

4. The 3D printing system of claim 1, wherein the building platform may be selectively lowered, and
   wherein the processor selectively controls the building platform to lower the building platform as the part is printed.

* * * * *